United States Patent
Wang et al.

(10) Patent No.: US 8,280,427 B2
(45) Date of Patent: Oct. 2, 2012

(54) GAIN FACTOR/MATRIX FOR WHOLE LINK CHANNEL RECIPROCITY IN TDD MIMO RELAY SYSTEM

(75) Inventors: Haifeng Wang, Shanghai (CN); Gang Wu, Shanghai (CN); Lihua Li, Beijing (CN); Lei Song, Beijing (CN); Ping Zhang, Beijing (CN); Xiafeng Tao, Beijing (CN)

(73) Assignee: Nokia Corporation, Espoo (FI)

( * ) Notice: Subject to any disclaimer, the term of this patent is extended or adjusted under 35 U.S.C. 154(b) by 384 days.

(21) Appl. No.: 12/622,014

(22) Filed: Nov. 19, 2009

(65) Prior Publication Data

US 2010/0151793 A1 Jun. 17, 2010

Related U.S. Application Data

(60) Provisional application No. 61/199,923, filed on Nov. 21, 2008.

(51) Int. Cl.
*H04Q 7/20* (2006.01)

(52) U.S. Cl. ............. 455/522; 455/69; 455/7; 455/11.1; 455/445; 455/13.1; 370/310; 370/315; 370/318; 370/321; 370/326

(58) Field of Classification Search ................... 455/522, 455/69, 7, 11.1, 500, 517, 445, 403, 422.113, 455/3, 23, 25, 507, 51, 5, 550.1, 426.1, 426.2; 370/310, 315, 318, 321, 326, 328, 329, 343
See application file for complete search history.

(56) References Cited

U.S. PATENT DOCUMENTS 7,899,073 B2 *  3/2011  Laroia et al. .................. 370/436
2006/0003697 A1 *  1/2006  Asai et al. ..................... 455/11.1

OTHER PUBLICATIONS

3GPP TSG RAN WG1 Meeting #54, R1-083155, Jeju, Korea, Aug 18-22, 2008. Source: Nortel, Title: On Different Relay Schemes for LTE-A.
TSG-RAN WG1 #54bis R1-083752, Prague, Czech Republic, Sep. 29-Oct. 3, 2008, Source: Ericsson, Title: Wireless relaying for the LTE evolution.
Hammerstrom, Ingmar; Kuhn, Marc; Wittneben, Armin "Impact of relay gain allocation on the performance of cooperative diversity networks" IEEE 60th Vehicular Technology Conference, VTC2004-Fall: Wireless Technologies for Global Security, 2004, p. 1815-1819.

(Continued)

*Primary Examiner* — Keith Ferguson
(74) *Attorney, Agent, or Firm* — Nokia Corporation

(57) ABSTRACT

Measured are received power of a first signal received from a first entity, and received power of a second signal received from a second entity. A gain factor (or a matrix of gain factors if multiple antennas are used) is determined using the measured received powers of the first signal and of the second signal. If transmit power from the apparatus to the second entity is considered as the benchmark, the second signal is forwarded from the apparatus to the first entity using a second signal transmit power that is determined using the gain factor. Or, if transmit power from the apparatus to the first entity is considered as the benchmark, the first signal is forwarded from the apparatus to the second entity using a first signal transmit power that is determined using the gain factor. Method, apparatus, and memory storing computer program are detailed.

16 Claims, 8 Drawing Sheets

OTHER PUBLICATIONS

Herdin, Markus "MIMO amplify-and-forward relaying in correlated MIMO channels" 2005 Fifth International Conference on Information, Communications and Signal Processing, 2005, p. 796-800.

Tang, Xiaojun (Wireless Information Network Laboratory, Rutgers University); Hua, Yingbo "Optimal design of non-regenerative MIMO wireless relays" IEEE Transactions on Wireless Communications, v 6, n 4, Apr. 2007, p. 1398-1406.

Byung K; Yi, Shu Wang; Soon Y;Kwon "On MIMO Relay with Finite-Rate Feedback and Imperfect Channel Estimation" Global Telecommunications Conference, 2007. GLOBECOM '07. IEEE Nov. 26-30, 2007 pp. 3878-3882.

P.U. Sripathi and J.S.Lehnert, "A throughput scaling law for a class of wireless relay networks," in Proc. 38th Annual Asilomar Conference on Signals, Systems and Computers 2004.

Zhang Jingmei; Shao Chunju; Wang Ying; Zhang Ping; "Optimal power allocation for multiple-input-multiple-output relaying system" VTC2004-Fall. 2004 IEEE 60th vol. 2, Sep. 26-29, 2004 pp. 1405-1409.

R1-082327, Samsung, "Application of network coding in LTE-advanced relay", Warsaw, Poland, Jun. 2008.

R1-082397, Panasonic, "Discussion on the various types of Relays", Warsaw, Poland, Jun. 2008.

R1-082470, Ericsson, "Self backhauling and lower layer relaying", Warsaw, Poland, Jun. 2008.

R1-082517, Nortel, "Transparent relay for LTE-A FDD", Warsaw, Poland, Jun. 2008.

* cited by examiner

GAIN FACTOR/MATRIX FOR WHOLE LINK CHANNEL RECIPROCITY IN TDD MIMO RELAY SYSTEM

PRIORITY CLAIM TO A PROVISIONAL PATENT APPLICATION

This patent application claims priority under 35 U.S.C. '119(e) from Provisional Patent Application No. 61/199,923, filed Nov. 21, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to relay nodes in a wireless communication system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following conventional notations are used in this description:
Bold uppercase and lowercase denote the matrices and vectors respectively,
$(\bullet)^T$: the transpose operation of the matrix.
$(\bullet)^*$: the conjugate operation of the matrix or the element.
$(\bullet)^H$: the conjugate-transpose operation of the matrix.
$\text{tr}\{\bullet\}$: the trace of the matrix.
$\text{diag}\{\bullet\}$: the diagonal matrix formed by the given elements
$[y]^+$: the maximal value of the y and zero.

A communication system known as evolved UTRAN (E-UTRAN, also referred to as UTRAN-long term evolution LTE or as E-UTRA) is currently under development within the $3^{rd}$ generation partnership project (3GPP). LTE-A is an advancement to the basic (Release-8) LTE system in which relay stations are more prominent. The IEEE 802.16m also makes more significant use of relay stations. Each of these systems are exemplary but non-limiting environments in which these teachings may be employed.

There has been significant research into relay systems in recent years. With a relay station (RS) between a source station (SS) and a destination station (DS), the SS does not need to use a high transmit power to extend its coverage. There are considered two primary approaches for relay systems: an amplify-and-forward (AF) mode; and a decode-and-forward (DF) mode. In an AF, the RS amplifies the signal it receives from the SS and retransmits the amplified signal to the DS. In a DF, the RS decodes the signal received from the SS, recodes it, and transmits the re-coded signal to the DS. These teachings are directed to the AF approach. It is noted that the SS need not be the originator of the signal and the DS need not to be the end user; either or both the SS and the DS may also be RSs. The terms SS and DS are used herein simply to distinguish the direction that the signal moves through the RS.

The design of the gain factor/matrix at the RS is important in an AF type relay system. Different designs can obtain different performance. Some gain matrices are designed to maximize the instantaneous throughput of the system, and some gain matrices are designed to diagonalize the overall MIMO channel at the RS, which will allow the RS to optimally choose the gain coefficient for each eigenmode while fulfilling the transmit power constraint. An example of the former may be seen in a paper by Ingmar Hammerstrom, Marc Kuhn, and Armin Wittneben entitled: "IMPACT OF RELAY GAIN ALLOCATION ON THE PERFORMANCE OF COOPERATIVE DIVERSITY NETWORKS" (IEEE 60th Vehicular Technology Conference, VTC2004-Fall: Wireless Technologies for Global Security, 2004, p 1815-1819). An example of the latter may be seen in a paper by Markus Herdin, entitled: "MIMO AMPLIFY-AND-FORWARD RELAYING IN CORRELATED MIMO CHANNELS" (2005 Fifth International Conference on Information, Communications and Signal Processing, 2005, p 796-800).

No matter which criterion is satisfied, all of the gain matrices perform amplification to the signal received by the RS, for all of them are just multiplied by the signal and the operation is linear.

The gain factor/matrix is designed following some criterion in downlink and uplink. The channel information of the first hop is usually used as a part of the gain factor in the design. See for example a paper by Xiaojun Tang and Yingbo Hua, entitled: "OPTIMAL DESIGN OF NON-REGENERATIVE MIMO WIRELESS RELAYS" (IEEE Transactions on Wireless Communications, v 6, n 4, April, 2007, p 1398-1406). But the channel of the first hop in the downlink and the uplink are totally different, which will lead the gain matrices of the downlink and the uplink to be different although they may be designed following the same criterion.

With the above approach in the frequency division duplex (FDD) mode, when the SS needs to know the whole link channel information before the signal was sent, the SS can simply receive feedback from the RS or DS prior to sending that signal. This of course incurs an extra expense of signaling overhead, and introduces much delay in the whole relay procedure. Therefore the actual link performance is degraded, and this type of degradation is more serious than the system without a multi-hop relay network. Further details of this conclusion can be seen in a paper by K. Byung, Yi, Shu Wang Yi. Y. Soon, and Kwon, entitled: "ON MIMO RELAY WITH FINITE-RATE FEEDBACK AND IMPERFECT CHANNEL ESTIMATION" (Global Telecommunications Conference, 2007. GLOBECOM '07. IEEE 26-30 Nov. 2007 Page(s):3878-3882).

What is needed in the art is a more efficient approach to AF relaying.

SUMMARY

In a first aspect thereof the exemplary embodiments of this invention provide a method comprising measuring at an apparatus received power of a first signal received from a first entity, and measuring at the apparatus received power of a second signal received from a second entity. The method further comprises determining by the apparatus a gain factor using the measured received powers of the first signal and of the second signal. In the method, a signal is forwarded according to either of two cases. For the case in which transmit power from the apparatus to the second entity is considered as a benchmark, the gain factor is used to determine a second signal transmit power and the second signal is forwarded from the apparatus to the first entity using the determined second signal transmit power. Or, for the case in which the transmit power from the apparatus to the first entity is considered as the benchmark, the gain factor is used to determine a first signal transmit power and the first signal is forwarded from the apparatus to the second entity using the determined first signal transmit power.

In a second aspect thereof the exemplary embodiments of this invention provide an apparatus comprising at least one processor and at least one memory including computer program code. The at least one memory and the computer program code is configured, with the at least one processor, to cause the apparatus to perform: measuring received power of a first signal received from a first entity, and measuring received power of a second signal received from a second entity; determining a gain factor using the measured received powers of the first signal and of the second signal; and forwarding a signal by either: a) for the case in which transmit power from the apparatus to the second entity is considered as a benchmark, using the gain factor to determine a second signal transmit power and forwarding the second signal from the apparatus to the first entity using the determined second signal transmit power; or b) for the case in which the transmit power from the apparatus to the first entity is considered as the benchmark, using the gain factor to determine a first signal transmit power and forwarding the first signal from the apparatus to the second entity using the determined first signal transmit power.

In a third aspect thereof the exemplary embodiments of this invention provide a memory storing a computer readable program of instructions which when executed by a processor cause the processor to perform actions comprising: measuring received power of a first signal received from a first entity, and measuring received power of a second signal received from a second entity; determining a gain factor using the measured received powers of the first signal and of the second signal; and forwarding a signal by either: a) for the case in which transmit power from the apparatus to the second entity is considered as a benchmark, using the gain factor to determine a second signal transmit power and forwarding the second signal from the apparatus to the first entity using the determined second signal transmit power; or b) for the case in which the transmit power from the apparatus to the first entity is considered as the benchmark, using the gain factor to determine a first signal transmit power and forwarding the first signal from the apparatus to the second entity using the determined first signal transmit power.

These and other exemplary aspects and embodiments of the invention are detailed below with particularity.

DETAILED DESCRIPTION

In multiple input multiple output (MIMO) relay systems with two hops (e.g., SS to RS to DS, though additional hops may be present), sometimes in the prior art the two hops' channels are processed jointly. For the case where the SS's precoding of the signal is based on singular value decomposition (SVD), the two hops' channels and gain matrix of the RS can be seen as an equivalent channel. Precoding will then be done in the SS and combining will be done in the DS. These teachings are relevant to the concept of processing two hops' channels jointly in time division duplex (TDD) MIMO relay system.

In the TDD mode, the amplification of the RS makes the whole link lose the reciprocity between downlink DL (from BS toward MS) and uplink UL (from MS toward BS). The SS can only know the channel information from RS to SS, from DS to SS and the channel information from SS to RS. The whole link channel information from SS to DS should be fed back to the SS, which also introduces the extra expense and delay like the frequency division duplex (FDD) mode. Embodiments of this invention go to the design of the gain factor/matrix, in a manner that keeps the whole link reciprocal.

Before specific embodiments of such a gain factor/matrix are presented, first is detailed some analysis to illustrate why the gain factor/matrix detailed herein work better than prior art AF designs, and why those prior art designs cannot produce a gain factor/matrix such as those described herein.

Figure 1:
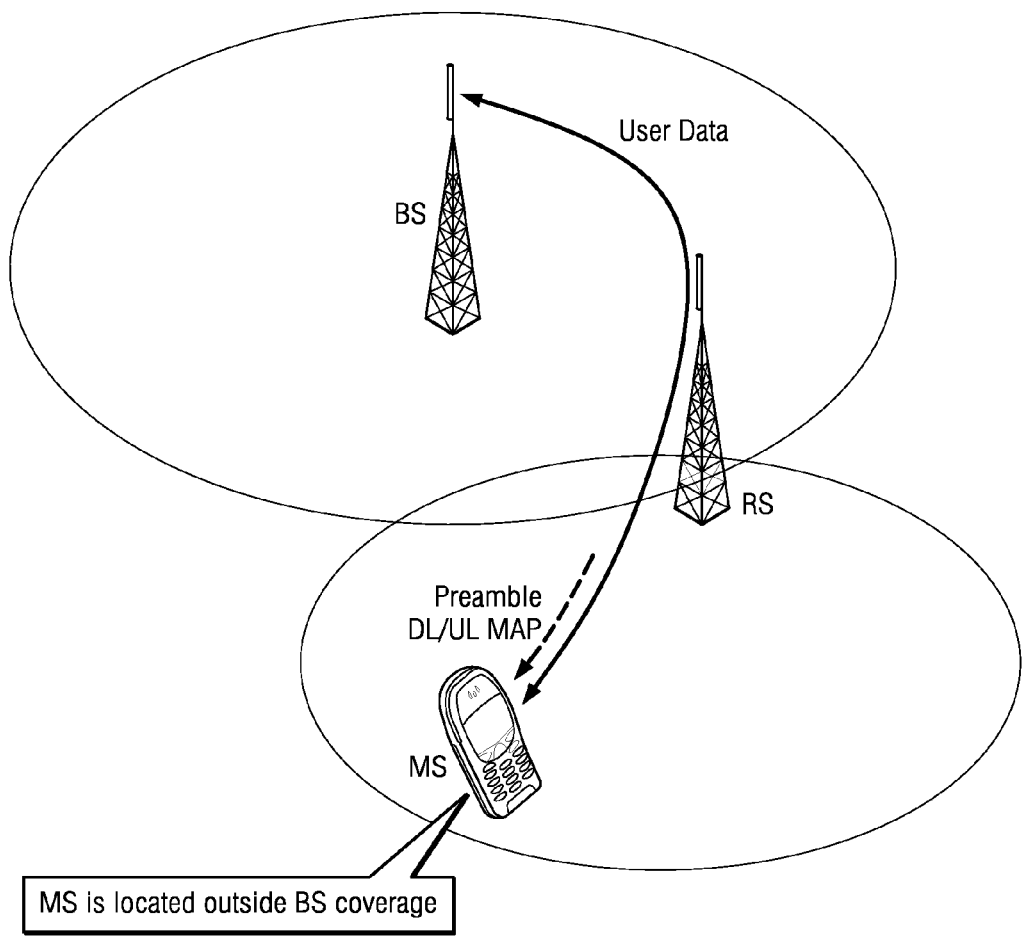
FIG. 1 is a schematic diagram illustrating an environment in which embodiments of the present invention may be implemented.

The gain matrices of the RS can be divided into two types mainly. One type is the diagonal matrix in which the elements of the diagonal represents the gain factor of the RS. The other type is a non-diagonal matrix. The gain matrix is the multiplied result of the diagonal matrix and the channel information. Here the channel information includes the channel matrix, the decomposed results of the channel, and so on. Assume for this review that there is no direct path between the Base Station (BS) and Mobile Station (MS) and the scenario is as illustrated at FIG. 1: the MS is located outside the coverage area of the BS and the RS is necessary for signal propagation between BS and MS.

In this TDD system, every transmission burst is divided into two time slots and the detail protocols of the downlink DL and uplink UL are shown below at Table 1 and Table 2, respectively.

TABLE 1

| the protocol of the downlink of the system | |
| --- | --- |
| Time slot | Transmission direction |
| $1^{st}$ time slot | BS→RS |
| $2^{nd}$ time slot | RS→MS |

TABLE 2 the protocol of the uplink of the system

| Time slot | Transmission direction |
|---|---|
| $1^{st}$ time slot | MS→RS |
| $2^{nd}$ time slot | RS→BS |

The following parameters are defined for this analysis. In the downlink, $H_{BR}^{DL}$ is the channel matrix from BS to RS during time slot 1, $H_{RM}^{DL}$ is the channel matrix from RS to MS during time slot 2. The terms $n_{RS}^{DL}$ and $n_{MS}^{DL}$ are complex Gaussian noise vectors at the RS and MS, respectively: $n_{RS}^{DL} \sim CN(0, (\sigma_{RS}^{DL})^2 I)$, $n_{MS}^{DL} \sim CN(0, (\sigma_{MS}^{DL})^2 I)$ (For example: x~CN(a,b): the vector x follows complex circular white Gaussian distribution. The expectation of it is a and the covariance matrix is b. I is an identity matrix.) The terms $P_{BS}^{DL}$ and $P_{RS}^{DL}$ represent the total transmit power at the BS and RS, respectively. The terms $\rho_{RS}^{DL}$ and $\rho_{MS}^{DL}$ represent the normalized signal to noise ratio SNR at the RS and MS respectively, where $$\rho_{RS}^{DL} = \frac{P_{BS}^{DL}}{M(\sigma_{RS}^{DL})^2}, \rho_{MS}^{DL} = \frac{P_{RS}^{DL}}{L(\sigma_{MS}^{DL})^2}.$$

In the uplink, the parameters are similar to the downlink parameters, with different superscripts changed to reflect UL rather than DL, and the subscript of the parameters of the downlink "RM" meaning RS to MS is changed in the uplink to "MR" meaning MS to RS; and in the downlink "BR" meaning BS to RS is changed in the uplink to "RB" meaning RS to BS. Assume for this explanation that the transmit power of every antenna in the BS and the MS is equal.

Figure 2:
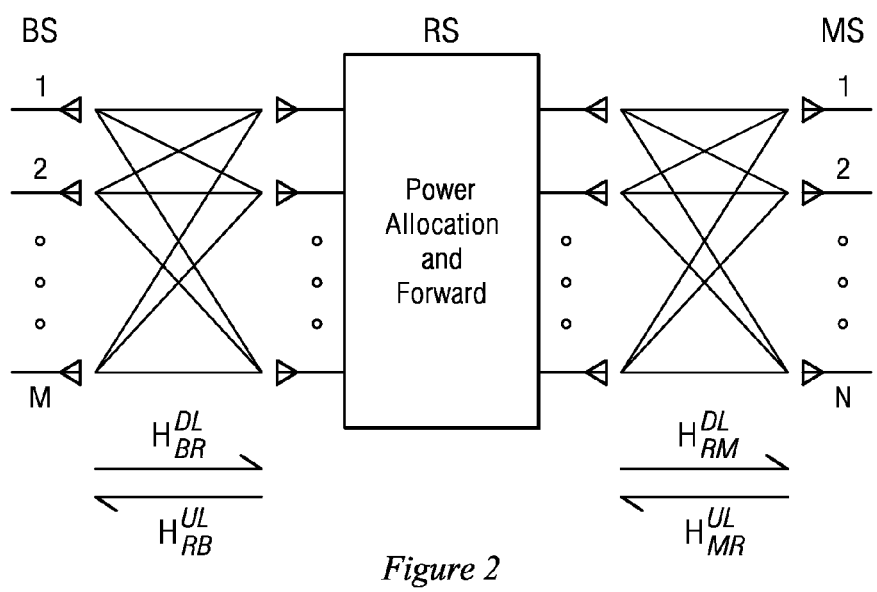
FIG. 2 is a schematic diagram of a system model for a prior art NAF and UPA schemes for amplify and forward relay.

Consider first the case where the gain matrix is a diagonal matrix and a Native Amplify-and-Forward (NAF) scheme is used. This relaying scheme could simply normalize the received signal to meet the power constraint and then forward the signal to the destination. The system has three terminals, a BS with M antennas, a MS with N antennas and a RS with L antennas. An exemplary system model is shown in FIG. 2.

In this case, the gain matrix at the relay is:

$$G_{naf} = \eta_1 I.$$

In the downlink, the total transmit power of the RS is $P_{RS}^{DL}$ and the total receive power at the RS is $$tr\left\{(\sigma_{RS}^{DL})^2 I + \frac{P_{BS}^{DL}}{M} H_{BR}^{DL}(H_{BR}^{DL})^H\right\},$$

where the term sigma δ is the element of the noise covariance matrix and represents the noise variance. So the power constraint factor can be achieved as:

$$\eta_1^{DL} = \sqrt{\frac{P_{RS}^{DL}}{tr\left\{(\sigma_{RS}^{DL})^2 I + \frac{P_{BS}^{DL}}{M} H_{BR}^{DL}(H_{BR}^{DL})^H\right\}}}.$$

In the uplink, $$\eta_1^{UL} = \sqrt{\frac{P_{RS}^{UL}}{tr\left\{(\sigma_{RS}^{UL})^2 I + \frac{P_{MS}^{UL}}{N} (H_{RM}^{DL})^T((H_{RM}^{DL})^T)^H\right\}}}.$$

Although the transmit power of the corresponding terminals and variance of the noise and the number of the antennas can be identical in the design, $H_{BR}^{DL}$ and $(H_{RM}^{DL})^T$ cannot be identical, which will lead the gain matrix of the downlink $G^{DL}$ to be different from the gain matrix of the uplink $G^{UL}$. As noted above, the whole link therefore loses its reciprocity.

Consider secondly the case where the gain matrix is a diagonal matrix and a Uniform Power Allocation (UPA) scheme is used. In the system, there is a BS with M antennas, a MS with N antennas and a RS with L antennas or L RSs with single antenna or multiple RSs with total L antennas. In this example, the system has a RS with L antennas. This system model is also shown at FIG. 2.

In this scheme, the transmit power of each antenna in the RS is equal, but the gain factor of each antenna of the RS is different. It is assumed that $G_{upa} = \text{diag}\{g_1, g_2, \ldots, g_L\}$.

In the downlink, the transmit power of every antenna of the RS is $P_{RS}^{DL}/L$ and the receive power of the antenna l(l=1, 2, ..., L) is $$(\sigma_{RS}^{DL})^2 + \frac{P_{BS}^{DL}}{M} \sum_{i=1}^{M} H_{BR,l,i}^{DL}(H_{BR,l,i}^{DL})^H.$$

So the gain factor of the RS l(l=1, 2, ..., L) can be achieved as:

$$g_l^{DL} = \sqrt{\frac{P_{RS}^{DL}/L}{(\sigma_{RS}^{DL})^2 + \frac{P_{BS}^{DL}}{M} \sum_{i=1}^{M} H_{BR,l,i}^{DL}(H_{BR,l,i}^{DL})^*}}$$

In the uplink, $$g_l^{UL} = \sqrt{\frac{P_{RS}^{UL}/L}{(\sigma_{RS}^{UL})^2 + \frac{P_{MS}^{UL}}{N} \sum_{i=1}^{N} H_{MR,l,i}^{UL}(H_{MR,l,i}^{UL})^*}}$$

$$= \sqrt{\frac{P_{RS}^{UL}/L}{(\sigma_{RS}^{UL})^2 + \frac{P_{MS}^{UL}}{N} \sum_{i=1}^{N} H_{RM,i,l}^{DL}(H_{RM,i,l}^{DL})^*}}.$$

Similar to the NAF scheme, the first hop's channel is involved in the gain factor design, and the whole link loses its reciprocity even if the same design method is adopted in the downlink and the uplink.

Figure 3:
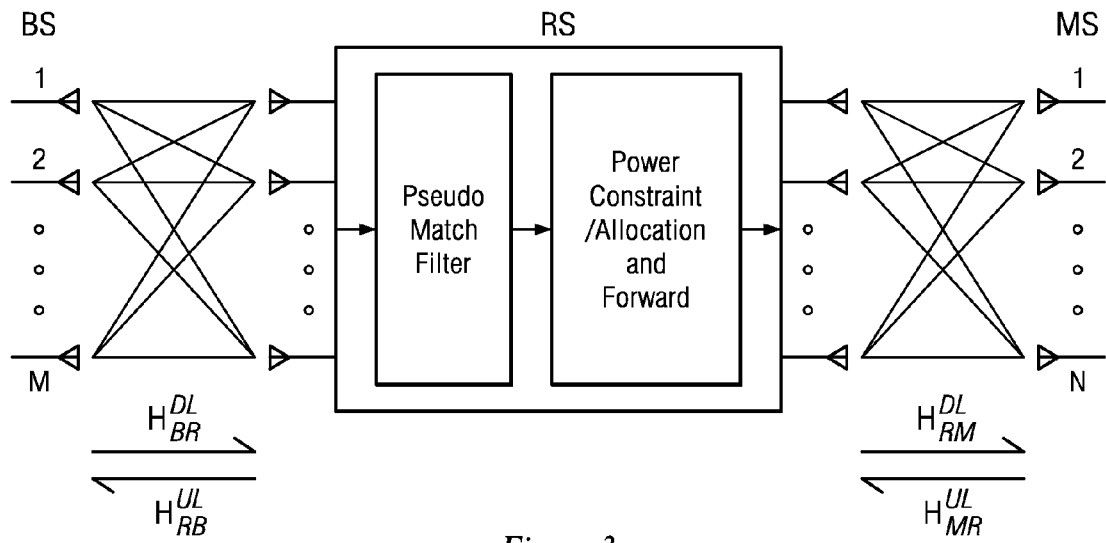
FIG. 3 is a schematic diagram of a system model for a prior art PMF scheme for amplify and forward relay.

Consider thirdly the case where the gain matrix is not a diagonal matrix and a Pseudo Match-and-Forward (PMF) scheme is used. It is another simple choice of relay matrix; see for example P. U. Sripathi and J. S. Lehnert, "A THROUGHPUT SCALING LAW FOR A CLASS OF WIRELESS RELAY NETWORKS," (Proc. $38^{th}$ Annual Asilomar Conference on Signals, Systems and Computers 2004). There are a BS with M antennas, a MS with N antennas and a RS with L antennas. The downlink system model is shown at FIG. 3. After the pseudo match filter, power allocation like the NAF scheme or the UPA scheme is done. In this example, a power constraint like NAF is used.

In the downlink, $$G_{pmf}^{DL} = \eta_2^{DL} I (H_{RM}^{DL})^H (H_{BR}^{DL})^H.$$

The power constraint is done after the equivalent channel $(H_{RM}^{DL})^H (H_{BR}^{DL})^H H_{BR}^{DL}$.

The gain matrix of the uplink is:

$$G_{pmf}^{UL} = \eta_2^{UL}(H_{RB}^{UL})^H (H_{MR}^{UL})^H = \eta_2^{UL}((H_{RM}^{DL})^H (H_{BR}^{DL})^H)^T.$$

The above formulas show that the reciprocity of the gain matrix between the downlink and the uplink lies on the power constraint. Only if the power constraint matrix is reciprocal in the downlink and the uplink can $G_{pmf}^{UL} = (G_{pmf}^{DL})^T$.

In the downlink, the equivalent channel before the power constraint at the RS is $(H_{RM}^{DL})^H (H_{BR}^{DL})^H H_{BR}^{DL}$. While in the uplink, the equivalent channel is $(H_{RB}^{UL})^H (H_{MR}^{UL})^H H_{MR}^{UL}$. Therefore:

$$(H_{RM}^{DL})^H (H_{BR}^{DL})^H H_{BR}^{DL} \neq ((H_{RB}^{UL})^H (H_{MR}^{UL})^H H_{MR}^{UL})^T.$$

From the NAF scheme we can conclude that the power constraint factor in the PMF scheme is different and the gain matrix is not reciprocal. So the relay matrix loses reciprocity.

Figure 4:
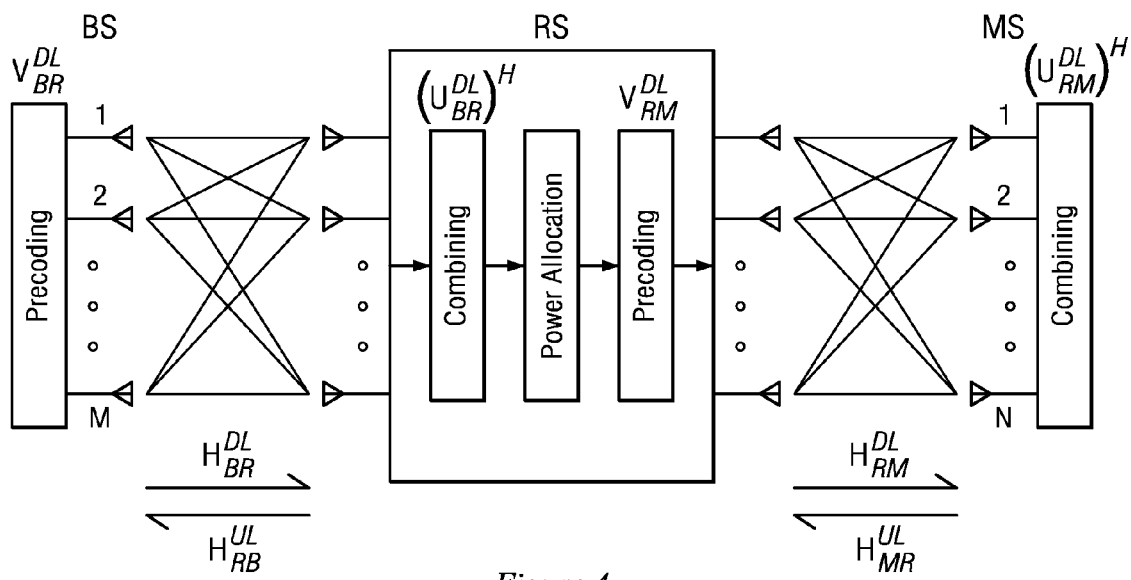
FIG. 4 is a schematic diagram of a system model for a prior art OR scheme for amplify and forward relay.

Consider fourthly the case where the gain matrix is not a diagonal matrix and an Optimal Relaying scheme is used (or the scheme in the paper noted above by Xiaojun Tang and Yingbo Hua, entitled: "OPTIMAL DESIGN OF NON-REGENERATIVE MIMO WIRELESS RELAYS". This scheme is seen to be the optimal relaying design to optimize the capacity between the source and the destination. The downlink system model is shown in at FIG. 4.

In the downlink, let the eigenvalue decompositions of $H_{BR}^{DL}(H_{BR}^{DL})^H$ and $(H_{RM}^{DL})^H H_{RM}^{DL}$ be:

$$H_{BR}^{DL}(H_{BR}^{DL})^H = U_{BR}^{DL} \Sigma_{BR}^{DL} (U_{BR}^{DL})^H (H_{RM}^{DL})$$
$$H_{RM}^{DL} = V_{RM}^{DL} \Sigma_{RM}^{DL} (V_{RM}^{DL})^H$$

where $\Sigma_{BR}^{DL}$ is a diagonal matrix which comes from the eigen value decomposition (EVD) of $H_{BR}^{DL}(H_{BR}^{DL})$, and its elements are the eigen values of $H_{BR}^{DL}(H_{BR}^{DL})^H$. $\Sigma_{RM}^{DL}$ has the same meaning for the RS to MS link;

$\Lambda_{BR}^{DL}$ is a diagonal matrix which comes from the singular value decomposition (SVD) of $H_{BR}^{DL}$, and its elements are the singular values of $H_{BR}^{DL}$. $\Lambda_{RM}^{DL}$ has the same meaning for the RS to MS link; and $U_{BR}^{DL}$ and $V_{BR}^{DL}$ are the left unitary matrix and right unitary matrix which come from the SVD of the $H_{BR}^{DL}$.

The singular value decomposition of $H_{BR}^{DL}$ and $H_{RM}^{DL}$ are:

$$H_{BR}^{DL} = U_{BR}^{DL} \Lambda_{BR}^{DL} (V_{BR}^{DL})^H$$
$$H_{RM}^{DL} = U_{RM}^{DL} \Lambda_{RM}^{DL} (V_{RM}^{DL})^H;$$

where $U_{BR}^{DL}$, $V_{BR}^{DL}$, $U_{RM}^{DL}$, $V_{RM}^{DL}$ are unitary matrices, $\Sigma_{BR}^{DL} = \text{diag}\{\alpha_1^{DL}, \alpha_2^{DL}, \ldots, \alpha_L^{DL}\}$ with $\alpha_1^{DL} \geq 0$ and $\Sigma_{RM}^{DL} = \text{diag}\{\beta_1^{DL}, \beta_2^{DL}, \ldots, \beta_L^{DL}\}$ with $\beta_1^{DL} \geq 0$. All eigenvalues are arranged in the descending order.

The optimal gain matrix is given by:

$$G_{or}^{DL} = V_{RM}^{DL} \Lambda_F^{DL} (U_{BR}^{DL})^H;$$

where $\Lambda_F^{DL} = \text{diag}(f_1^{DL}, f_2^{DL}, \ldots, f_L^{DL})$. It can be considered that after the combination of the $(U_{BR}^{DL})^H$, the power allocation is done at the RS, and then the precoding is done using $V_{RM}^{DL}$.

In the uplink, the optimal gain matrix is:

$$G_{or}^{UL} = V_{RB}^{UL} \Lambda_F^{UL} (U_{MR}^{UL})^H = (V_{RM}^{DL} \Lambda_F^{UL} (U_{BR}^{DL}))^T.$$

But this is true only if $\Lambda_F^{UL} = \Lambda_F^{DL}$, $G_{or}^{UL} = (G_{or}^{DL})^T$, i.e. the gain matrix of the downlink and the uplink are reciprocal.

Next we analyze the power allocation. In the downlink, the amplified coefficient of the RS $l(l=1, 2, \ldots, L)$ is:

$$f_l^{DL} = \sqrt{\frac{\left[\sqrt{(\rho_{RS}^{DL}\alpha_l^{DL})^2 + 4\rho_{RS}^{DL}\alpha_l^{DL}\beta_l^{DL}\mu^{DL}} - \rho_{RS}^{DL}\alpha_l^{DL} - 2\right]^+ (\sigma_{MS}^{DL})^2}{2\beta_l^{DL}\left((\sigma_{RS}^{DL})^2 + \frac{P_{BS}^{DL}}{M}\alpha_l^{DL}\right)}}.$$

In the above formula, $[y]^+ = \max(0, y)$ and $\mu^{DL}$ is the unique positive root of the below equation:

$$\sum_{l=1}^{L} \frac{1}{2\beta_l^{DL}} \left[\sqrt{(\rho_{RS}^{DL}\alpha_l^{DL})^2 + 4\rho_{RS}^{DL}\alpha_l^{DL}\beta_l^{DL}\mu^{DL}} - \rho_{RS}^{DL}\alpha_l^{DL} - 2\right]^+ (\sigma_{MS}^{DL})^2 = P_{RS}^{DL}.$$

In the uplink, the amplify coefficient can be derived with the same rule.

The eigenvalues of the two hops' channels cannot be identical. Even if other parameters are designed appropriately; the power allocation matrices of the downlink and the uplink are hard to be identical.

The comparison of these four prior schemes is summarized below:

| Schemes | Advantages | Disadvantages |
|---------|-----------|---------------|
| NAF | The operation in the RS is simple. | The power allocation in the RS is not optimal. The whole link loses the reciprocity. All antennas need to accomplish power allocation jointly. |
| UPA | The operation in the RS is simple. Each antenna can allocate the power independently. | The power allocation in the RS is not optimal. The whole link loses the reciprocity. |
| PMF | The equivalent match filter has been done in this scheme. | The power allocation in the RS is not optimal. The whole link loses the reciprocity. The operation in the RS is complex, channel estimation needs to be done. All antennas need to accomplish power allocation jointly. |
| OR | The power allocation in the RS can achieve the optimal system capacity. | The operation in the RS is complex. The whole link loses the reciprocity. All antennas need to accomplish power allocation jointly. |

From the above four schemes we can conclude that what confines the reciprocity of the whole link between the downlink and the uplink is the power allocation at the RS.

Now consider a TDD MIMO AF relay system with two hops. In the case that the SS needs to know the whole link channel information to perform some advanced processing, such as precoding and power allocation to achieve maximum (or at least improved) throughput, the whole link channel reciprocity is needed to avoid having to feedback the channel information. In the current approaches to amplification at the RS, the whole link from SS to DS usually loses the reciprocity. As will be detailed below, there is a way to design an amplification factor in the RS to ensure the channel reciprocity of multiple relays. These teachings can be used in TDD AF mode if the reciprocity is needed. While the description below details multiple relays, this is not a limit to these teachings as the amplification may be equivalently employed at a single relay with multiple antennas.

Embodiments of the invention are advantageously employed in the scenario that there is no line of sight (LOS) between BS (SS) and MS (DS) so that the MS is located outside the coverage of BS, such as illustrated at FIG. 1.

Figure 5:
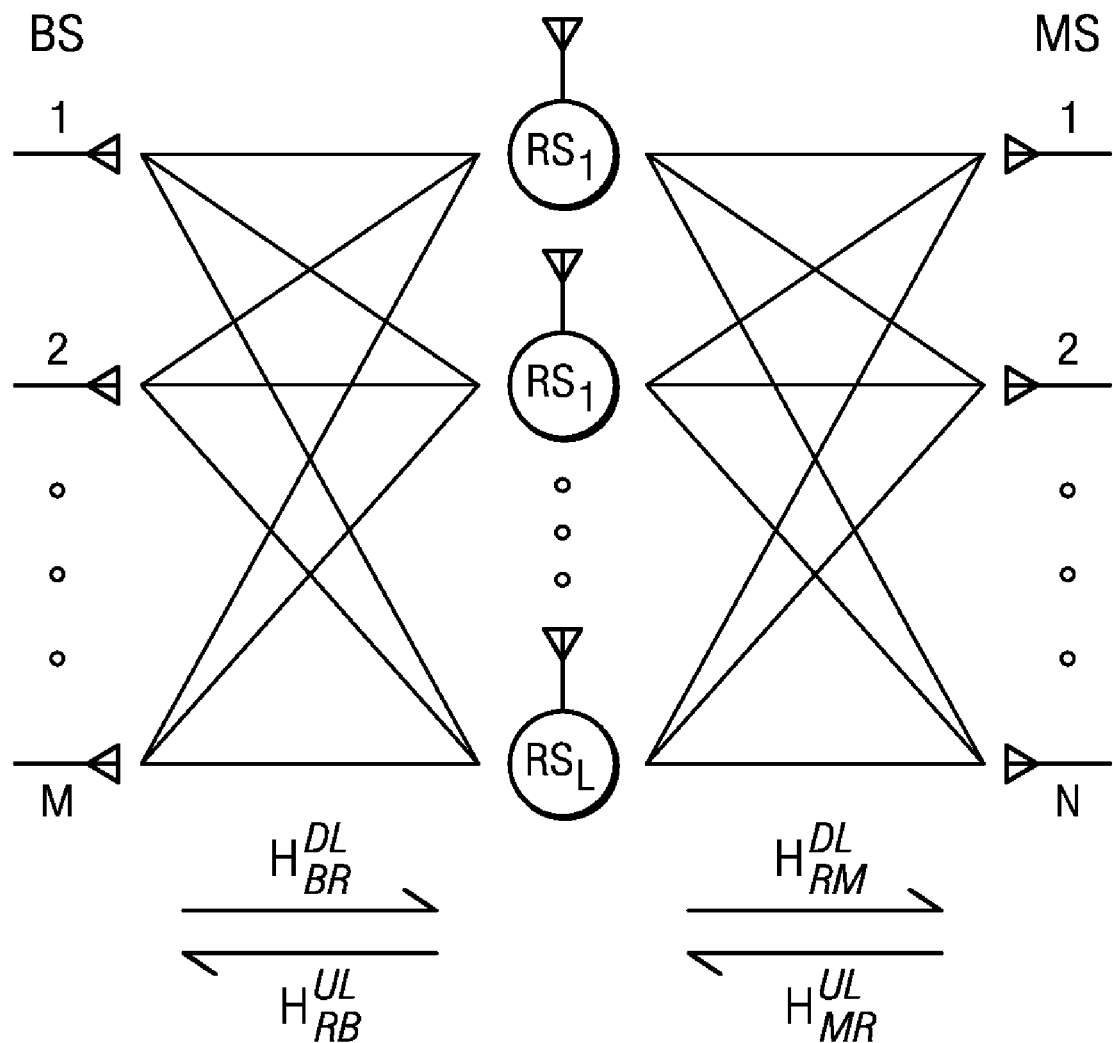
FIG. 5 is a schematic diagram of a system model according to an exemplary embodiment of the invention.
Figure 5:
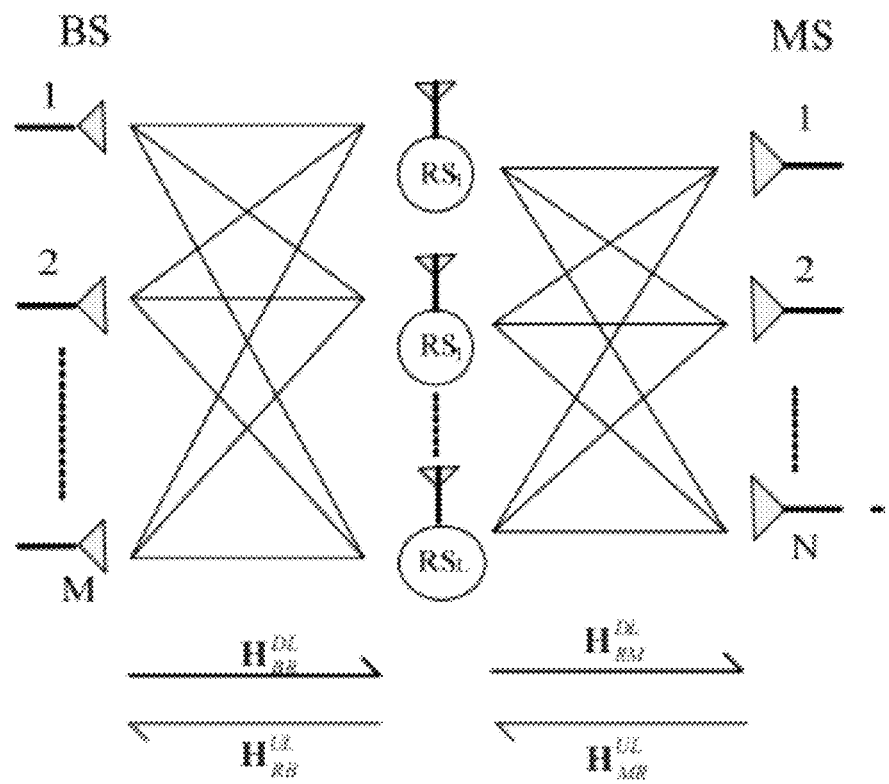

Now are detailed specific examples of how the gain matrix employing amplification to achieve reciprocity may be implemented. In an example system, there is a BS with M antennas, a MS with N antennas and a RS with L antennas (or equivalently L RSs each with a single antenna, or multiple RSs with total of L antennas). M, N and L are each positive integers, at least one of which is greater than one. In this particular example, the system has L RSs each with a single antenna and the system model is illustrated at FIG. 5. This is the simplest model that the relays merely amplify and forward the signal, and it can be extended to any AF mode relay system.

The downlink channel between BS and RSs is $H_{BR}^{DL}$, the gain matrix of the RSs is $G^{DL}$ and it is a diagonal matrix with each element representing the amplification of the each RS (each antenna). The downlink channel between the RSs and the MS is $H_{RM}^{DL}$. The whole downlink equivalent channel information can be acquired:

$$H_{eq}^{DL} = H_{RM}^{DL} G^{DL} H_{BR}^{DL} \quad (1)$$

In the uplink, the channel information between MS and RSs is $H_{MR}^{UL}$, the gain matrix of the RSs is $G^{UL}$, and the uplink channel information between RSs and BS is $H_{RB}^{UL}$. Because of the reciprocity between the downlink and the uplink channel, we can know that $H_{RB}^{UL} = (H_{BR}^{DL})^T$ and $H_{MR}^{UL} = (H_{RM}^{DL})^T$. The whole uplink equivalent channel information can be acquired:

$$H_{eq}^{UL} = H_{RB}^{UL} G^{UL} H_{MR}^{UL} = (H_{BR}^{DL})^T G^{UL} (H_{RM}^{DL})^T = (H_{RM}^{DL} (G^{UL})^T H_{BR}^{DL})^T \quad (2)$$

In order to keep the reciprocity between the whole downlink equivalent channel and the whole uplink equivalent channel, i.e. $H_{eq}^{UL} = (H_{eq}^{DL})^T$, we need $(H_{RM}^{DL} (G^{UL})^T H_{BR}^{DL})^T = (H_{RM}^{DL} G^{DL} H_{BR}^{DL})^T$. Then the final result is:

$$G^{DL} = (G^{UL})^T \quad (3)$$

For the gain matrix which is a diagonal matrix, $(G^{UL})^T = G^{UL}$, equation (3) can be written as:

$$G^{DL} = G^{UL} \quad (4)$$

This means that the elements of the gain matrix in downlink and uplink need to be identical, i.e. the amplified effect of each RS needs to be identical in downlink and uplink.

We define that $G^{DL} = \text{diag}[g_1^{DL}, g_2^{DL}, \ldots, g_L^{DL}]$, $g_l^{DL}$ (l=1, 2, ..., L) represents the amplification gain of the RS l. $H_{BR}^{DL} = (h_{BR,i,j}^{DL})_{L \times m}$, $H_{RM}^{DL} = (h_{RM,i,j}^{DL})_{N \times L}$, $h_{BR,i,j}^{DL}$ represents the channel from the antenna of the BS to antenna i of the RS in the first DL hop, and $h_{RM,i,j}^{DL}$ represents the channel from the antenna j of the RS to antenna i of the MS in the second DL hop. Further, $P_{RS,l}^{DL}$ represents the transmit power of the RS l in the downlink and $P_{BS,m}^{DL}$ represents the transmit power of the antenna m of the BS in the downlink; and also $(\sigma_{RS,l}^{DL})^2$ represents the noise power of the RS l received in the downlink. Then we can get the receive power at the RS in the downlink:

$$\sum_{m=1}^{M} P_{BS,m}^{DL} |h_{BR,l,m}^{DL}|^2 + (\sigma_{RS,l}^{DL})^2$$

From the transmit power and the receive power at the RS, the amplification gain at the RS l in the downlink can be written:

$$g_l^{DL} = \sqrt{\frac{P_{RS,l}^{DL}}{\sum_{m=1}^{M} P_{BS,m}^{DL} |h_{BR,l,m}^{DL}|^2 + (\sigma_{RS,l}^{DL})^2}} \exp(j\phi_l^{DL}) \quad (5)$$

where $\phi_l^{DL}$ represents the phase offset of the local oscillator (LO) at the RS l relative to a given reference phase. This phase offset is required in the system model, because LOs of all relays may be free running. Only if there is a global phase reference, i.e., all LOs are phase synchronized, $\phi_l^{DL}$ is equal to zero for all l. Now we assume all LOs to be phased locked, i.e. $\{\phi_l^{DL}\}=0$. Then we can derive:

$$g_l^{DL} = \sqrt{\frac{P_{RS,l}^{DL}}{\sum_{m=1}^{M} P_{BS,m}^{DL} |h_{BR,l,m}^{DL}|^2 + (\sigma_{RS,l}^{DL})^2}} \quad (6)$$

In order to denote the relationship between the downlink and the uplink clearly, we define the uplink parameters similar to the downlink parameters, just changing the superscript of the parameters of the downlink "DL" to "UL". Then we can acquire the gain of the RS l in the uplink:

$$g_l^{UL} = \sqrt{\frac{P_{RS,l}^{UL}}{\sum_{n=1}^{N} P_{MS,n}^{UL} |h_{MR,l,n}^{UL}|^2 + (\sigma_{RS,l}^{UL})^2}} \quad (7)$$

In TDD mode, $h_{MR,l,n}^{UL} = h_{RM,n,l}^{DL}$. Then we can get:

$$g_l^{UL} = \sqrt{\frac{P_{RS,l}^{UL}}{\sum_{n=1}^{N} P_{MS,n}^{UL} |h_{RM,n,l}^{DL}|^2 + (\sigma_{RS,l}^{UL})^2}} \quad (8)$$

As detailed above, in order to guarantee the reciprocity between the whole downlink and the uplink channel, the elements of the gain matrix in downlink and uplink need to be identical, i.e. $g_l = g_l$.

$$\sqrt{\frac{P_{RS,l}^{DL}}{\sum_{m=1}^{M} P_{BS,m}^{DL} |h_{BR,l,m}^{DL}|^2 + (\sigma_{RS,l}^{DL})^2}} = \sqrt{\frac{P_{RS,l}^{UL}}{\sum_{n=1}^{N} P_{MS,n}^{UL} |h_{RM,n,l}^{DL}|^2 + (\sigma_{RS,l}^{UL})^2}} \quad (9)$$

It is easily derived that:

$$P_{RS,l}^{UL} = \frac{\sum_{n=1}^{N} P_{MS,n}^{UL}|h_{RM,n,l}^{DL}|^2 + (\sigma_{RS,l}^{UL})^2}{\sum_{m=1}^{M} P_{BS,m}^{DL}|h_{BR,l,m}^{DL}|^2 + (\sigma_{RS,l}^{DL})^2} P_{RS,l}^{DL} \quad (10\text{-a})$$

$$P_{RS,l}^{DL} = \frac{\sum_{m=1}^{M} P_{BS,m}^{DL}|h_{BR,l,m}^{DL}|^2 + (\sigma_{RS,l}^{DL})^2}{\sum_{n=1}^{N} P_{MS,n}^{UL}|h_{RM,n,l}^{DL}|^2 + (\sigma_{RS,l}^{UL})^2} P_{RS,l}^{UL} \quad (10\text{-b})$$

Figure 7:
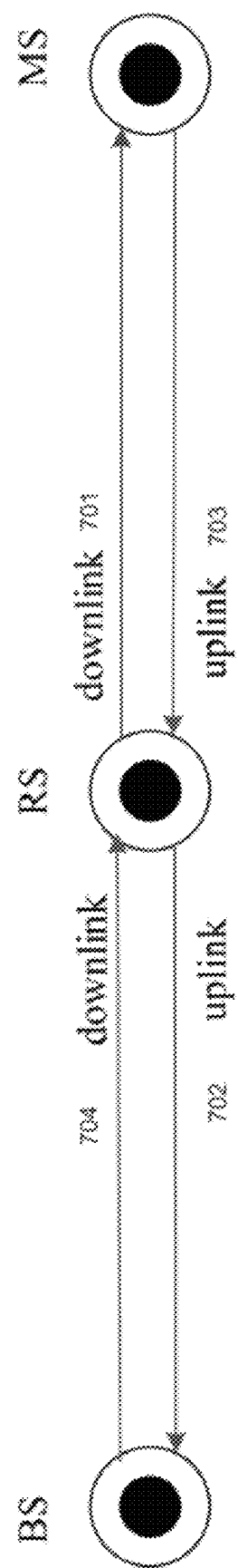
FIG. 7 is a schematic diagram showing particularly the uplinks and downlinks used in the description below.

With reference to FIG. 7, if the transmit power of the RS in the downlink 701 (from RS to MS) is the benchmark, we can get the uplink's (from RS to BS) transmit power 702 following the equation (10-a). If instead the transmit power of the RS in the uplink 702 is the benchmark, we can use equation (10-b) to get the downlink's transmit power 701. The RS measures the uplink received power 703 and the downlink received power 704.

In the practical system, the distance between the BS and RS is usually larger than the distance between RS and MS, so in that case the power will experience more attenuation in the hop between BS and RS than the hop between RS and MS.

In equation (10), $$\sum_{m=1}^{M} P_{BS,m}^{DL}|h_{BR,l,m}^{DL}|^2 + (\sigma_{RS,l}^{DL})^2$$

represents the receive power at the RSs in the downlink and $$\sum_{n=1}^{N} P_{MS,n}^{UL}|h_{RM,n,l}^{DL}|^2 + (\sigma_{RS,l}^{UL})^2$$

represents the receive power at the RSs in the uplink. If the transmit power of the BS and MS is equal, the former is always smaller than the latter. When equation (10-a) is used, the transmit power of the RS in the downlink is fixed and the uplink's power is larger than it. When equation (10-b) is used, the transmit power of the RS in the uplink is fixed and the downlink's power is smaller than it.

In an exemplary practical system, the transmit power of the RSs are usually needed to be constrained to some certain value, so the equation (10-b) will more frequently fit to the real system. The operation of the RSs is detailed at FIG. 6 as follows for the exemplary case in which the RSs transmit power is fixed in the uplink at block 604. At block 602, the RSs measure both the receive RS power in the uplink (from MS to RS) and the receive RS power in the downlink (from BS to RS). Then the RSs calculate the gain factors/matrix and store them at block 606. At block 608, the RSs modify the transmit power of the received signal from the BS in the downlink according to the stored gain factors. The above process from choosing the optimization criterion to design the gain factor/matrix through block 608 is repeated in the next transmission period.

The above procedure shows the operation in the RSs is very simple and each relay can accomplish the above process independently. When some advanced processing is used in the BS (MS), it can use channel estimation to estimate the whole link's channel and the RSs just need to do the operation described in FIG. 6. If some other operations are needed to be done in the RSs to enhance the other performances, it just needs put the above module in the position of the power allocation.

According to the above description results, embodiments of the invention provide four technical effects as compared with the prior art solutions detailed above. First, the whole link can guarantee the reciprocity. Second, the operation is simple at the RSs. Third, each relay (or each antenna of a multi-antenna relay) can accomplish the gain factor design independently, and the feedback signalling will be saved compared to the system that each relay needs to communicate with others to accomplish power allocation. Fourth, the approach detailed herein can be used with other AF schemes to improve the system performance. For instance, it can be used to design the amplify factors in schemes similar to PMF and OR to ensure the channel reciprocity.

It is noted that these teachings are seen to achieve, for the TDD AF mode, optimal performance for the uplink by some optimal amplification criterion, however the downlink can not achieve the optimal performance simultaneously.

Figure 8A:
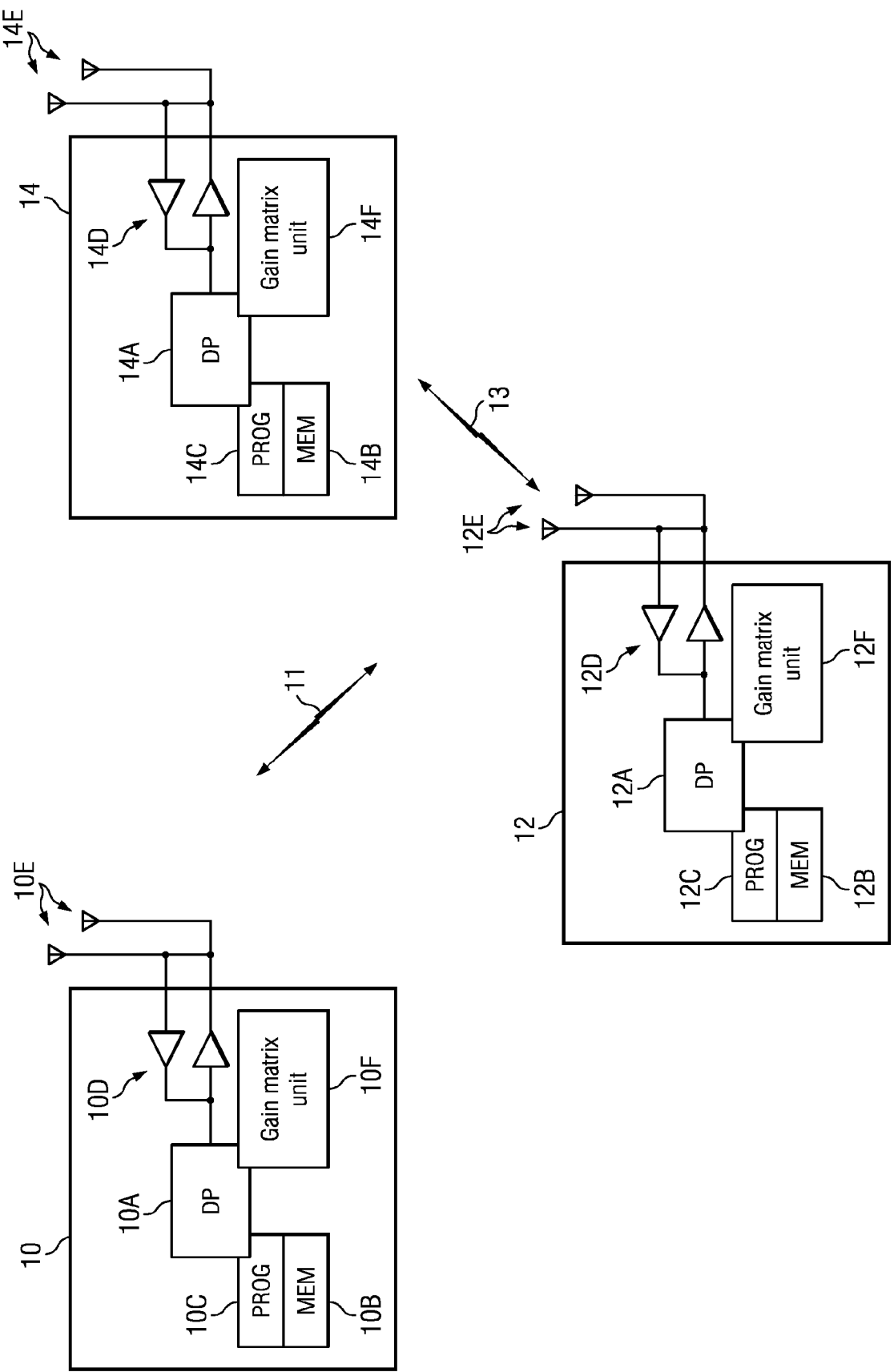
FIGS. 8A-8B show varying details and relations of various electronic devices which can be used to implement exemplary embodiments of the invention.

Reference is made to FIG. 8A for illustrating a simplified block diagram of various electronic devices and apparatus that are suitable for use in practicing the exemplary embodiments of this invention. In FIG. 8A a MS 10 communicates with an RS 12 over a wireless link 11. The MS 10 may be an apparatus, such as a mobile communication device which may be referred to as a UE 10. The MS/UE 10 may also be acting as an RS for the signals it sends and receives over the link 11, or it may be the originating SS or the DS depending on whether UL or DL is being considered. The RS 12 may be a UE, or a network operated relay station either fixed or mobile. There is also a BS 14 which may be another RS or a BS such as a Node B, an E-NodeB, or other named entity for a network access node. The BS may be operating at any given time as the SS or the DS, depending on whether UL or DL is being considered.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D which includes a power amplifier for bidirectional wireless communications with the RS 12 via one or more antennas 10E. The RS 12 also includes a controller, such as a computer or a data processor (DP) 12A, a computer-readable memory medium embodied as a memory (MEM) 12B that stores a program of computer instructions (PROG) 12C, and a suitable RF transceiver 12D which includes a power amplifier for communication with the UE 10 via one or more antennas 12E. The RS 12 is coupled via a wireless link 13 to the BS 14, which also includes a controller, such as a computer or a data processor (DP) 14A, a computer-readable memory medium embodied as a memory (MEM) 14B that stores a program of computer instructions (PROG) 14C, and a suitable RF transceiver 14D which includes a power amplifier for communication with the RS 12 via one or more antennas 14E.

At least one of the PROGs 10C, 12C and 14C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 12A of the RS 12 and/or by the DP 10A of the UE 10 and/or by the DP 14A of the BS 14, or by hardware, or by a combination of software and hardware (and firmware).

For the purposes of describing the exemplary embodiments of this invention the RS 12 may be assumed to also include a gain factor/matrix unit 12F, and the UE 10 may include a gain factor/matrix unit 10F and the BS 14 may itself also include a gain factor/matrix unit 14F.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The RS 12 may be implemented as a UE or as a BS.

The computer readable MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 8B:
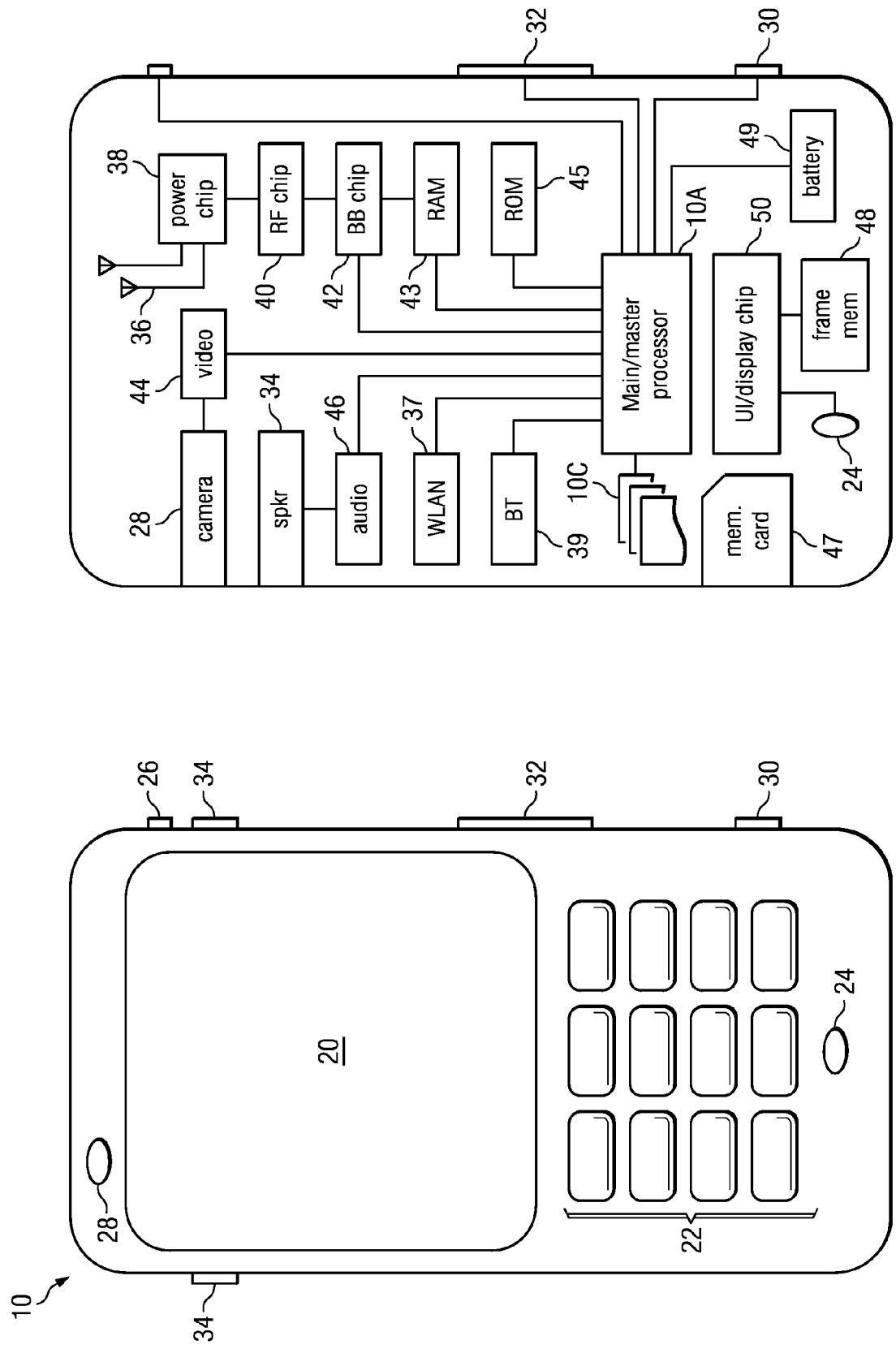

FIG. 8B illustrates further detail of an exemplary UE which may be used as a RS 12 in both plan view (left) and sectional view (right), and the invention may be embodied in one or some combination of those more function-specific components. When the RS is embodied as a network operated device such as the BS 14, most if not all the functionality, except perhaps those elements related to the user input and the display and camera, may also be included in that RS embodiment. At FIG. 8B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 8B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 acting as RS, or the RS 12, or the BS 14 acting as RS, may operate in a slave relationship to the main processor 10A, 12A, 14A which may then be in a master relationship to them. Embodiments of this invention are most relevant to the power chip 38 if present or else the RF chip 40 and/or the baseband chip 42 since generally the calculation of the gain factor is done in baseband, though it is noted that other embodiments need not be disposed there but may be disposed across various chips and memories as shown or disposed within another processor that combines some of the functions described above for FIG. 8B. Any or all of these various processors of FIG. 8B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the RS 12, which when embodied as a network operated device may have an array of tower-mounted antennas rather than the two shown at FIG. 8B.

Note that the various chips (e.g., 38, 40, 42, etc.) that were described above may be combined into a fewer number than described and, in a most compact case, may all be embodied physically within a single chip.

Figure 9:
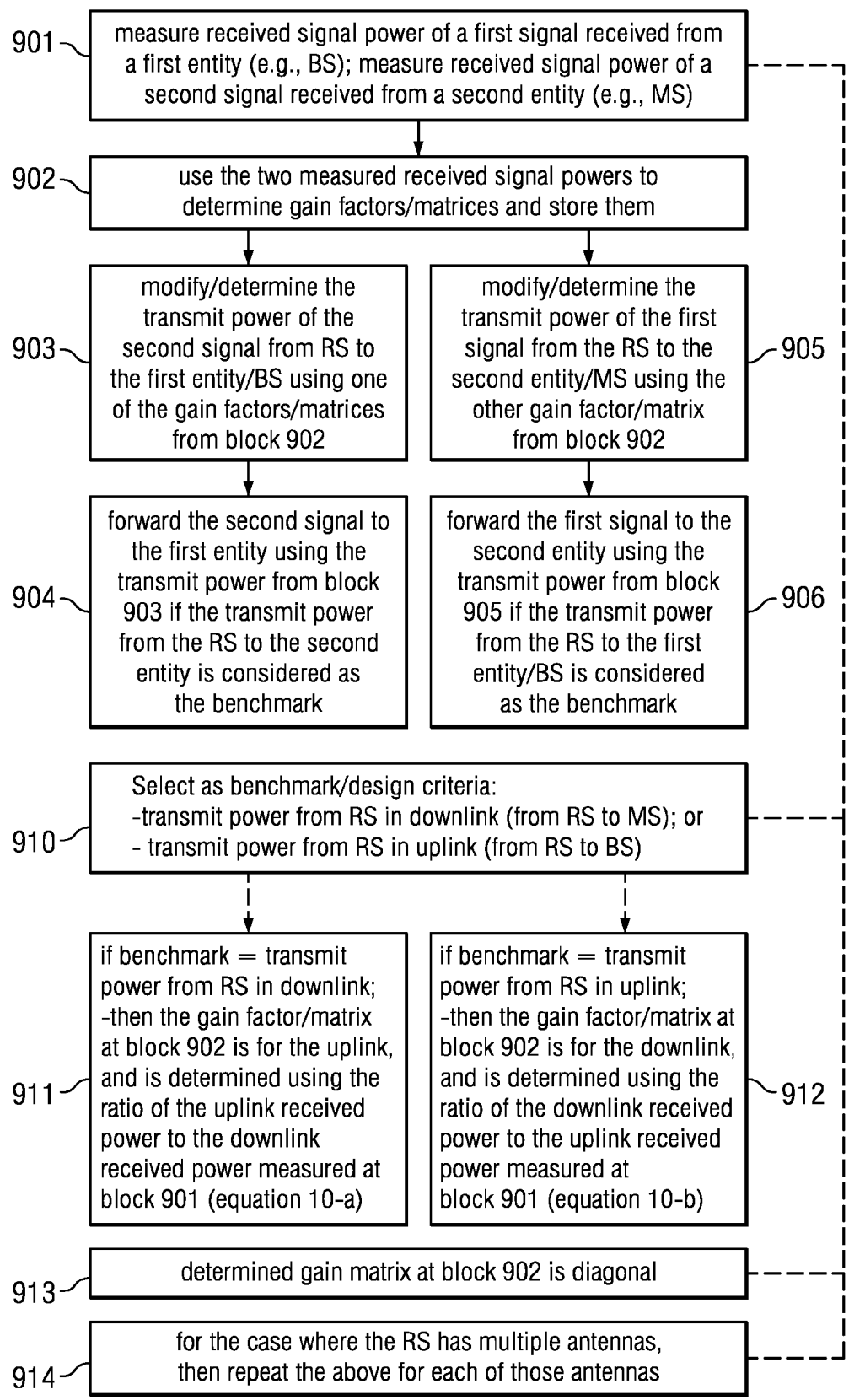
FIG. 9 is a logic flow diagram that further illustrates over FIG. 6 the operation of a method, and a result of execution of computer program instructions embodied on a computer readable memory, for operating the RS/RSs in accordance with the exemplary embodiments of this invention

Based on the foregoing it should be apparent that the exemplary embodiments of this invention provide a method, apparatus and computer program(s) as shown in FIG. 9. The RS measures the received signal power of a first signal from a first entity (BS) and of a second signal from a second entity (MS) (block 901), to use the two received signal powers to determine gain factors/matrixes (block 902), to modify (determine) the transmit power of the second signal from RS to the first entity/BS using one of the gain factors/matrices (block 903) and forward the second signal to the first entity (block 904, forward to the BS) using the determined transmit power if the transmit power from the RS to the second entity/MS is considered as the benchmark, or to modify (determine) the transmit power of the first signal from the RS to the second entity/MS using the other gain factor/matrix (block 905) and forward the first signal to the second entity (block 906, forward to the MS) using the determined transmit power if the transmit power from the RS to the first entity/BS is considered as the benchmark.

In a specific embodiment of the above paragraph shown at block 910, prior to determining the gain factor/matrix at block 902, the transmit power from RS in downlink (from RS to MS) or uplink (from RS to BS) are considered as the benchmarks.

At block 911 which further details block 910, if the transmit power from RS in downlink (from RS to MS) is considered as the benchmark, then the gain factor/matrix at block 902 is for the uplink and it is determined using the ratio of the uplink (the second entity/MS to the RS) received power to the downlink (the first entity/BS to the RS) received power measured in the RS, like the meaning in equation 10-a above.

At block 912 which further details block 910, if the transmit power from RS in uplink (from RS to BS) is considered as the benchmark, then the gain factor/matrix at block 902 is for the downlink and it is determined using the ratio of the downlink (the first entity/BS to the RS) received power to the uplink (the second entity/MS to the RS) received power measured in the RS, like the meaning in equation 10-b above.

At block 913, the gain matrix determined at block 902 is diagonal.

At block 914, for the case where the RS has multiple antennas, then the gain factor/matrix at block 902 is determined for each of those multiple antennas and the amplify and forwarding detailed in the other blocks uses those multiple antennas. The gain factor is for an RS with a single antenna, and the gain matrix is for MIMO at the RS and/or multiple RSs each with a single antenna.

Figure 6:
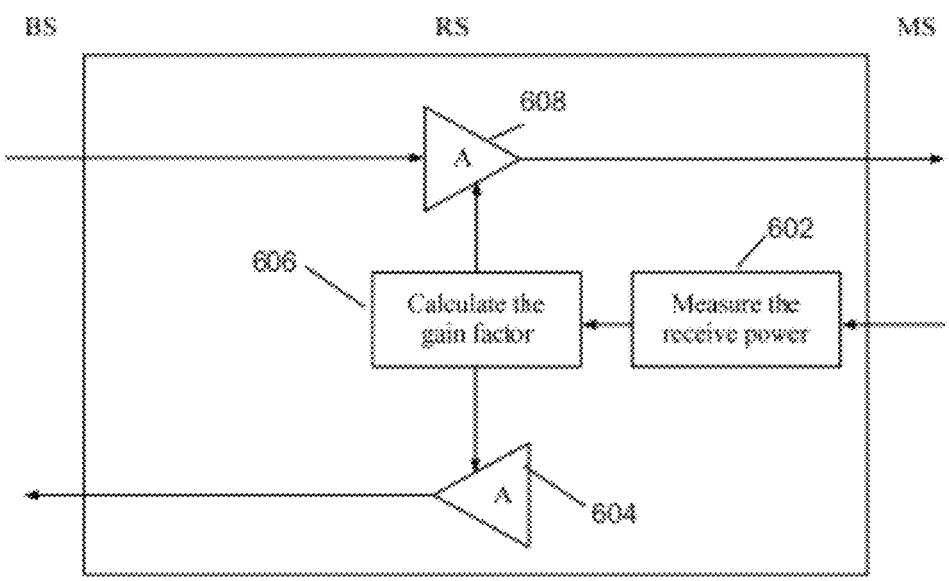
FIG. 6 is a logic flow diagram that illustrates the operation of a method, and a result of execution of computer program instructions embodied on a computer readable memory, for operating the RS/RSs in accordance with the exemplary embodiments of this invention.

The various blocks shown in FIG. 6 and/or 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   measuring at an apparatus received power of a first signal received from a first entity, and measuring at the apparatus received power of a second signal received from a second entity;
   determining by the apparatus a gain factor using the measured received powers of the first signal and of the second signal; and
   forwarding a signal by either:
      for the case in which transmit power from the apparatus to the second entity is considered as a benchmark, using the gain factor to determine a second signal transmit power and forwarding the second signal from the apparatus to the first entity using the determined second signal transmit power; or
      for the case in which the transmit power from the apparatus to the first entity is considered as the benchmark, using the gain factor to determine a first signal transmit power and forwarding the first signal from the apparatus to the second entity using the determined first signal transmit power,
   in which the apparatus comprises at least one relay node comprising M antennas on which the first signal and the second signal are received, and N antennas from which at least one of the first signal and the second signal are forwarded, in which N and M are integers and at least one of M and N is greater than one.

2. The method according to claim 1, in which:
   determining the gain factor comprises determining a gain matrix and storing the gain matrix in the apparatus;
   and using the gain factor comprises using at least one gain factor from the stored gain matrix.

3. The method according to claim 2, in which the gain matrix is a diagonal matrix.

4. The method according to claim 2, in which the first signal transmit power or the second signal transmit power is determined separately for each of the N transmit antennas, in which N is an integer greater than one.

5. The method according to claim 2, executed by a plurality of L relay stations operating in concert with one another;
   such that across all L relay stations there is a total of M antennas on which the first signal is received; and such that across all L relay stations there is a total of N antennas from which are forwarded the said at least one of the first signal and the second signal.

6. The method according to claim 1, in which:
the first signal received from the first entity is a downlink signal received from a base station;
the second signal received from the second entity is an uplink signal received from a user equipment;
the transmit power from the apparatus to the second entity which is the user equipment is considered as the benchmark; and
the second signal transmit power is determined using a ratio of the measured receive power of the uplink signal received from the user equipment to the measured receive power of the downlink signal received from the base station.

7. The method according to claim 1, in which:
the first signal received from the first entity is a downlink signal received from a base station;
the second signal received from the second entity is an uplink signal received from a user equipment;
the transmit power from the apparatus to the first entity which is the base station is considered as the benchmark; and
the first signal transmit power is determined using a ratio of the measured receive power of the downlink signal received from the base station to the measured receive power of the uplink signal received from the user equipment.

8. The method according to claim 1, in which the method is repeated for each of a series of transmission periods.

9. An apparatus comprising:
at least one processor; and
at least one memory including computer program code;
the at least one memory and the computer program code configured to, with the at least one processor, cause the apparatus to perform:
    measuring received power of a first signal received from a first entity, and measuring received power of a second signal received from a second entity;
    determining a gain factor using the measured received powers of the first signal and of the second signal; and
    forwarding a signal by either:
        for the case in which transmit power from the apparatus to the second entity is considered as a benchmark, using the gain factor to determine a second signal transmit power and forwarding the second signal from the apparatus to the first entity using the determined second signal transmit power; or
        for the case in which the transmit power from the apparatus to the first entity is considered as the benchmark, using the gain factor to determine a first signal transmit power and forwarding the first signal from the apparatus to the second entity using the determined first signal transmit power
where in the apparatus comprises a relay node comprising M antennas on which the first signal and the second signal are received, and N antennas from which at least one of the first signal and the second signal are forwarded, in which N and M are integers and at least one of M and N is greater than one.

10. The apparatus according to claim 9, in which:
determining the gain factor comprises determining a gain matrix and storing the gain matrix in the memory;
and using the gain factor comprises using at least one gain factor from the stored gain matrix.

11. The apparatus according to claim 10, in which the gain matrix is a diagonal matrix.

12. The apparatus according to claim 10, in which the first signal transmit power or the second signal transmit power is determined separately for each of the N transmit antennas, in which N is an integer greater than one.

13. The apparatus according to claim 9, in which:
the first signal received from the first entity is a downlink signal received from a base station;
the second signal received from the second entity is an uplink signal received from a user equipment;
the transmit power from the apparatus to the second entity which is the user equipment is considered as the benchmark; and
the second signal transmit power is determined using a ratio of the measured receive power of the uplink signal received from the user equipment to the measured receive power of the downlink signal received from the base station.

14. The apparatus according to claim 9, in which:
the first signal received from the first entity is a downlink signal received from a base station;
the second signal received from the second entity is an uplink signal received from a user equipment;
the transmit power from the apparatus to the first entity which is the base station is considered as the benchmark; and
the first signal transmit power is determined using a ratio of the measured receive power of the downlink signal received from the base station to the measured receive power of the uplink signal received from the user equipment.

15. The apparatus according to claim 9, in which the at least one memory and the computer program code are configured with the at least one processor to cause the apparatus to perform the said measuring, determining and forwarding for each of a series of transmission periods.

16. A memory storing a computer readable program of instructions which when executed by a processor cause the processor to perform actions comprising:
    measuring received power of a first signal received from a first entity, and measuring received power of a second signal received from a second entity;
    determining a gain factor using the measured received powers of the first signal and of the second signal; and
    forwarding a signal by either:
        for the case in which transmit power from the apparatus to the second entity is considered as a benchmark, using the gain factor to determine a second signal transmit power and forwarding the second signal from the apparatus to the first entity using the determined second signal transmit power; or
        for the case in which the transmit power from the apparatus to the first entity is considered as the benchmark, using the gain factor to determine a first signal transmit power and forwarding the first signal from the apparatus to the second entity using the determined first signal transmit power
in which:
    the first signal received from the first entity is a downlink signal received from a base station;
    the second signal received from the second entity is an uplink signal received from a user equipment;
    the transmit power from the apparatus to the second entity which is the user equipment is considered as the benchmark; and
    the second signal transmit power is determined using a ratio of the measured receive power of the uplink signal received from the user equipment to the measured receive power of the downlink signal received from the base station.

* * * * *